United States Patent
Grossman et al.

(10) Patent No.: US 8,905,177 B2
(45) Date of Patent: Dec. 9, 2014

(54) WHEELED PLATFORM POWERED BY A CARGO TRACKED VEHICLE AND METHOD OF PROPULSION CONTROL THEREOF

(71) Applicants: Vitaly Grossman, West Bloomfield, MI (US); Boris Mezir, Southfield, MI (US); Alisa Grossman, West Bloomfield, MI (US); Mike Nem, Southfield, MI (US)

(72) Inventors: Vitaly Grossman, West Bloomfield, MI (US); Boris Mezir, Southfield, MI (US); Alisa Grossman, West Bloomfield, MI (US); Mike Nem, Southfield, MI (US)

( * ) Notice: Subject to any disclaimer, the term of this patent is extended or adjusted under 35 U.S.C. 154(b) by 0 days.

(21) Appl. No.: 13/851,165

(22) Filed: Mar. 27, 2013

(65) Prior Publication Data
US 2013/0256047 A1    Oct. 3, 2013

Related U.S. Application Data

(60) Provisional application No. 61/685,906, filed on Mar. 27, 2012.

(51) Int. Cl.
*B62D 59/04* (2006.01)
*B60P 3/06* (2006.01)

(52) U.S. Cl.
CPC ............... *B60P 3/062* (2013.01); *B62D 59/04* (2013.01)
USPC .................................................. 180/198

(58) Field of Classification Search
CPC .......... B60P 3/062; B62D 59/04; E02F 9/003
USPC ......................................................... 180/198
See application file for complete search history.

(56) References Cited

U.S. PATENT DOCUMENTS

| | | | | |
|---|---|---|---|---|
| 2,014,769 A * | 9/1935 | Kossakowski | ............... | 105/159 |
| 2,250,070 A * | 7/1941 | Simmons | ..................... | 180/198 |
| 2,309,198 A * | 1/1943 | McCleneghan | ............... | 414/537 |
| 2,812,081 A * | 11/1957 | Schrader | ..................... | 414/537 |
| 3,195,664 A * | 7/1965 | Friesen | ..................... | 180/198 |
| 4,415,055 A * | 11/1983 | Ahn | .......................... | 180/198 |
| 6,412,582 B1 * | 7/2002 | Leavitt | ..................... | 180/182 |
| 6,659,214 B1 * | 12/2003 | Laing | ........................ | 180/198 |
| 7,815,004 B1 * | 10/2010 | Watkins et al. | ............... | 180/198 |
| 2010/0307850 A1 * | 12/2010 | Allen | ........................ | 180/198 |

FOREIGN PATENT DOCUMENTS

| | | | | |
|---|---|---|---|---|
| EP | 826581 A1 * | 3/1998 | ............ | B62D 59/04 |
| GB | 2276132 A * | 9/1994 | ............... | B60P 3/06 |

* cited by examiner

*Primary Examiner* — Kevin Hurley
(74) *Attorney, Agent, or Firm* — Kohn & Associates, PLLC (57) ABSTRACT

A system for the transport of a cargo tracked vehicle, including a wheeled mobile platform to carry the tracked vehicle, the wheeled mobile platform being powered by a power plant of the cargo tracked vehicle and controlled by at least one driving control of the cargo tracked vehicle. At least one controller assembly operatively connects at least one of the controls of the cargo tracked vehicle to at least one of the driving systems of the wheeled mobile platform, to allow a driver housed in the cargo tracked vehicle to drive the wheeled mobile platform. A method for transporting a cargo tracked vehicle on a wheeled mobile platform utilizing the power and driving controls of the cargo tracked vehicle. A system for driving a mobile wheeled platform under the power and control of a portable driver cabin.

12 Claims, 7 Drawing Sheets

WHEELED PLATFORM POWERED BY A CARGO TRACKED VEHICLE AND METHOD OF PROPULSION CONTROL THEREOF

TECHNICAL FIELD

The present invention relates to self propelled platforms for the transport of tracked vehicles, and more specifically to self-propelled platforms controllable by the driving controls of the tracked vehicle being transported.

BACKGROUND OF THE INVENTION

Tracked vehicles, such as earth movers, construction machinery, all terrain vehicles, and snowmobiles, are adapted to travel over rough and unstable terrain without becoming trapped or bogged down, but they are legally forbidden from most paved highways. Tracked vehicles tend to damage pavement, and many of these vehicles cannot travel at minimum highway speeds. For these reasons, tracked vehicles are usually transported to and from their sites of use on trailers. Typically, the tracked vehicle is carried on a tractor-towed flatbed trailer, or on a flatbed integrated into a truck body.

The transport of tracked vehicles on towed trailers or flatbed trucks is an extremely inefficient and wasteful transport system. The transport vehicle duplicates many of the costly systems of the tracked vehicle, particularly the power plant, and a fully equipped cab for a driver. The transport vehicle must carry its own fuel supply, and fuel consumption is increased by the fact that the tractor must propel its own weight. When the tracked vehicle requires specialized operating skills, its crew must also be accommodated either in the transport vehicle or in a separate convoyed vehicle. There is a need for a system and method for transporting a tracked vehicle that does not require a separate self-sufficient carrier vehicle.

SUMMARY OF THE INVENTION

The present invention provides a system for the transport of a cargo tracked vehicle including a wheeled mobile platform to carry the tracked vehicle, the platform being powered by the power plant of the tracked vehicle and controlled by the driving controls the tracked vehicle. The wheeled mobile platform includes at least one motor powerable by the power plant of the cargo tracked vehicle, and steering, acceleration, braking, transmission, and electrical systems controllable by, respectively, the steering, acceleration, braking, transmission, and electrical controls of the tracked vehicle. The present invention also provides a system for the transport of a cargo tracked vehicle, including a wheeled mobile platform having a plurality of driving systems, including a steering system, an acceleration system, a braking system, a transmission system, and a propulsion system; a cargo tracked vehicle mountable upon the wheeled mobile platform and having a power plant, at least one battery chargeable by the power plant, and a plurality of driving controls, including a steering control, a propulsion control, a braking control, and a transmission control; and at least one controller assembly operatively connecting at least one of the driving controls of the cargo tracked vehicle to at least one of the driving systems of the wheeled mobile platform, to allow a driver housed in the cargo tracked vehicle to drive the wheeled mobile platform. The present invention further provides a method for transporting a cargo tracked vehicle on a wheeled mobile platform utilizing the driving controls and power of the cargo tracked vehicle, including the steps of moving the cargo tracked vehicle onto a mounting surface of the wheeled mobile platform; anchoring the cargo tracked vehicle to the wheeled mobile platform; connecting an electrical power conduit between the cargo tracked vehicle and the wheeled mobile platform; electrically connecting a power source of the cargo tracked vehicle to an electric motor and an electrical system of the wheeled mobile platform; connecting a control and data conduit between the cargo tracked vehicle and the wheeled mobile platform; operatively connecting at least one driving control of the cargo tracked vehicle to a corresponding driving system of the wheeled mobile platform; and driving the wheeled mobile platform under the power and driving controls of the cargo tracked vehicle. The present invention still further provides a system for the transport of a cargo vehicle, including a cargo vehicle having a power plant for propelling the vehicle, and driving controls to control the movements of the vehicle; a wheeled mobile platform to carry the cargo vehicle; interconnecting power means for rendering the wheeled mobile platform powerable by the power plant of the cargo vehicle while the cargo vehicle is carried by the wheeled mobile platform; and interconnecting control means for rendering the movements of the wheeled mobile platform controllable the driving controls of the cargo vehicle while the cargo vehicle is carried by the wheeled mobile platform.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
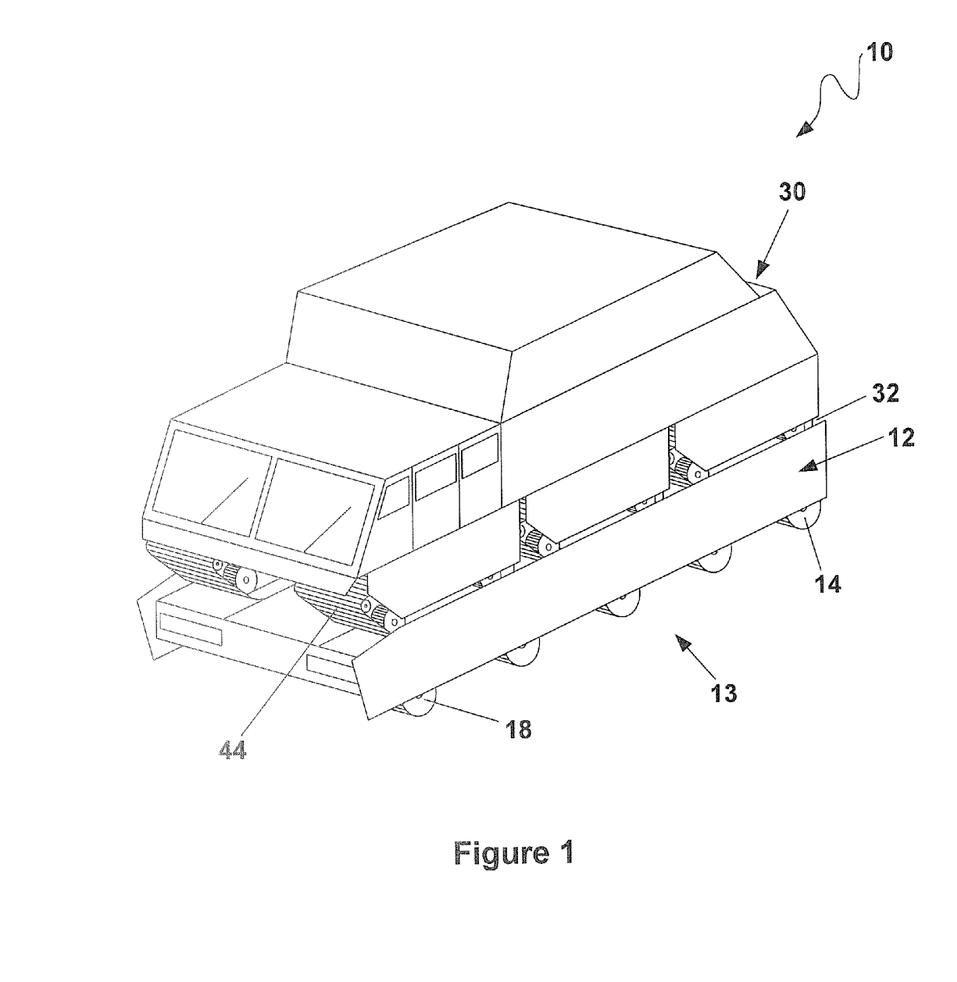
FIG. 1 shows a perspective view of a wheeled mobile platform and cargo tracked vehicle according to the present invention.
Figure 3:
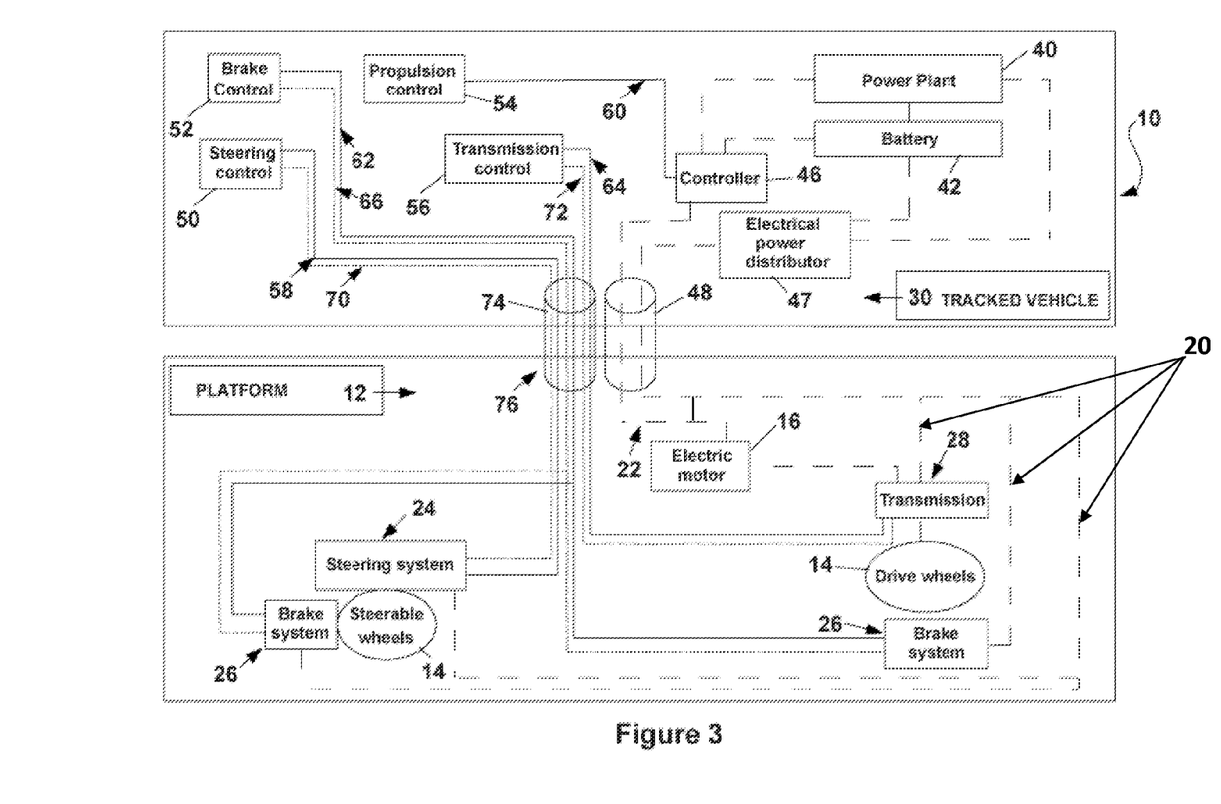
FIG. 3 shows a schematic diagram of the flows of controlling information (solid lines), feedback data (dotted lines) and electrical or mechanical power (dashed lines) between the cargo tracked vehicle and wheeled platform according to the present invention.

A system for the transport of a cargo tracked vehicle according to the present invention is generally shown at 10 in FIGS. 1 and 3. The system 10 includes a wheeled mobile platform 12 preferably including at least four road wheels 13, the road wheels including at least one drive wheel 14 powered by an electric motor 16, and at least two steerable wheels 18. The wheeled mobile platform 12 also includes a propulsion system 22, a steering system 24, a braking system 26, a transmission system 28, and an electrical system 20, to provide electrical power to the aforementioned systems. The invention 10 also includes a cargo tracked vehicle 30 mountable on the platform 12, including driving controls engageable to control the electrical system 20, acceleration system 22, steering system 24, braking system 26, and transmission system 28 of the wheeled mobile platform 12.

Figure 2:
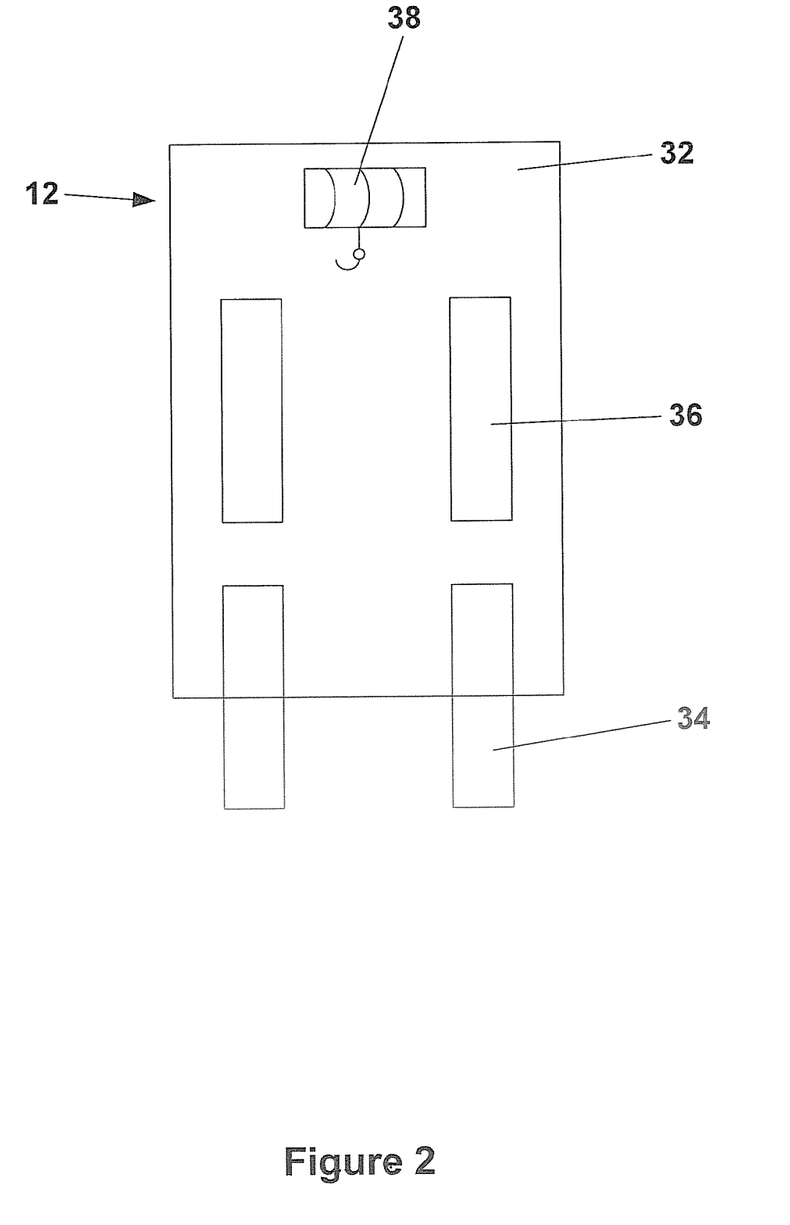
FIG. 2 shows an overhead schematic view of a wheeled platform according to the present invention.

As best shown in FIG. 2, the wheeled mobile platform 12 also includes a mounting surface 32 to support and anchor the cargo tracked vehicle 30 during transport. The wheeled mobile platform 12 preferably also includes at least one ramp 34 to enable the cargo tracked vehicle 30 to be driven onto the platform under its own power, and at least one anchor 36 to immobilize the cargo tracked vehicle 30. The wheeled mobile platform 12 can optionally include a winch 38, to facilitate loading of the wheeled mobile tracked vehicle 30 onto the mounting surface.

The cargo tracked vehicle 30 is preferably a vehicle powered by a power plant 40 generating an electrical output, preferably a gasoline or diesel powered electrical generator. The power plant 40 of the cargo tracked vehicle 30 charges at least one battery 42. During the independent operation of the cargo tracked vehicle 30, the power plant 40 and battery 42 serve as power sources for an electric motor (not shown) of the cargo tracked vehicle 30 to drive the tracks 44 of the cargo tracked vehicle 30. The cargo tracked vehicle 30 includes driving controls of any suitable type known in the art, including a steering control 50, such as a steering wheel or joystick, a brake control 52, such as a brake pedal, propulsion control 54, such as an accelerator pedal, and transmission control 56 such as a transmission selector lever. During operation of the cargo tracked vehicle 30 independent of the wheeled mobile platform 12, these controls are used by the driver of the cargo tracked vehicle 30 to control the movements and other functions of the cargo tracked vehicle 30 via driving systems, including a steering system (not shown), a braking system (not shown) propulsion system (not shown) and a transmission system (not shown) of the cargo tracked vehicle 30. These driving systems are powered by the electrical system (not shown) of the cargo tracked vehicle 30, which receives its power from the power plant 40 and battery 42. Upon mounting of the cargo tracked vehicle 30 upon the wheeled mobile platform 12, the power output of the power plant 40 and battery 42 is disconnected from the electrical system (not shown) of the cargo tracked vehicle 30 and connected via a power conduit 48 to the electric motor 16 and electrical system 20 of the wheeled mobile platform 12. The driving controls of the cargo tracked vehicle 30 are disconnected from the driving systems (not shown) of the cargo tracked vehicle 30 and operatively connected to the driving systems of the wheeled mobile platform 12, including the propulsion system 22, steering system 24, braking system 26, and transmission system 28 of the wheeled mobile platform 12. The operative connections between the driving controls of the cargo tracked vehicle 30 and the driving system of the wheeled mobile platform 12 are mediated by controller and feedback assemblies, which are described in detail below. A control and data conduit 74 is provided to serve as a physical connection to permit the flow of commands and information between the driving controls of the cargo tracked vehicle 30 and the wheeled mobile platform 12. Alternatively, the connection between the driving controls of the cargo tracked vehicle 30 and the wheeled mobile platform 12 can be mediated by any suitable wireless transmitters and receivers (not shown) known in the art. The redirection of power output and driving control from the cargo tracked vehicle 30 to the wheeled mobile platform 12 can be accomplished by any switching mechanism known in the art, including mechanical disconnection and reconnection, and solid-state electronic switching.

Once power output and driving control have been redirected from the cargo tracked vehicle 30 to the wheeled mobile platform 12, the power plant 40 and battery 42 serve as sources of electrical power to the electric motor 16, which powers the drive wheels 14 of the wheeled mobile platform 12. The power plant 40 and battery 42 also provide electrical power to the various systems of the wheeled mobile platform 12 via the electrical system 20 of the wheeled mobile platform 12. In an alternative configuration (not shown), at least one battery 42 can be situated in the wheeled mobile platform 12. The specific properties of the battery 42 are selected according to the voltage, power, and endurance requirements of the particular cargo tracked vehicle 30 and mobile wheeled platform 12 to which the present invention is applied.

The electric motor 16 can include any electric motor of suitable power output and appropriate size and weight to propel a particular combination of wheeled mobile platform 12 and cargo tracked vehicle 30. Preferably the electric motor 16 includes a wire-wound rotor with self cleaning contact rings, because it eliminates the need for the rare and strategic composition neodymium. The power plant 40 and the battery 42 are electrically connected to the electric motor 16 by means of an electrical controller 46, which regulates power output to the electric motor 16. The power plant 40 and the battery 42 are also electrically connected to the electrical system 20 of the wheeled mobile platform 12, preferably through an electrical power distributor 47, which distributes electrical power to the all other systems of the wheeled mobile platform 12, including the propulsion system 22, a steering system 24, a braking system 26, a transmission system 28. In the embodiment shown in FIG. 3, the battery 42 and electrical controller 46 are situated within the cargo tracked vehicle 30 and the electrical power distributor 47 is situated within the wheeled mobile platform 12, but any alternative situation of these devices is possible. For example, the battery 42 and electrical controller 46 can be situated within the wheeled mobile platform 12 (not shown).

Preferably, the driving systems of the wheeled mobile platform 12 are controlled by the same steering control 50, brake control 52, propulsion control 54, and transmission control 56 utilized to control the cargo tracked vehicle 30 during its independent operation. Alternatively, one or more separate controls (not shown) situated in the cargo tracked vehicle 30 can be reserved for the control of one or more driving systems of the wheeled mobile platform 30.

The present invention includes controller assemblies operatively connecting the controls of the cargo tracked vehicle 30 to the corresponding driving systems of the wheeled mobile platform 12, to enable a driver housed in the cargo tracked vehicle 30 to drive the wheeled mobile platform 12. That is, the controller assemblies of the present invention enable a driver housed in the cargo tracked vehicle 30 to control at least one of the driving systems, and preferably all of the driving systems, of the wheeled mobile platform 12. The controller assemblies are indicated as numbered solid connecting lines in the schematic shown in FIG. 3. The controller assemblies include a steering controller assembly 58, a propulsion controller assembly 60, a braking controller assembly 62, and a transmission controller assembly 64. For at least a subset of the driving systems of the wheeled mobile platform 12, the present invention also includes feedback assemblies to provide real-time information about the performance of each driving system to the driver of the cargo tracked vehicle 30. The feedback assemblies, indicated as numbered dotted connecting lines in FIG. 3, include at least a braking feedback assembly 66, a steering feedback assembly 70, and a transmission feedback assembly 72. In the preferred embodiment, each controller assembly transmits commands from a driving control of the cargo tracked vehicle 30 to the corresponding driving system of the mobile wheeled platform 12 in the form of electrical signals transmitted via a wired control link. Each feedback assembly transmits data in the form of low-current electrical signals also transmitted via a wired data link. The wired command and data links are carried by a control and data conduit 74. Alternatively, commands and data can be transmitted between the cargo tracked vehicle 30 and wheeled mobile platform 12 by any suitable combination of wireless transmitters and wireless receivers known in the art.

In the preferred embodiment of the present invention, the controller assemblies are generally characterized as "drive by wire" control assemblies well known in the art. A controller assembly suitable for the present invention includes a sensor (not shown), to continually sense the driver's adjustment of a driving control; a servo controller (not shown), usually integrated with the sensor, to process data produced by the sensor and accordingly generate electronic commands; and a servo motor (not shown) situated in the wheeled mobile platform 12, to receive the electronic commands and translate them into adjustments or actuations of a device in the wheeled mobile platform 12. Examples of specific assemblies are provided below.

A control and data conduit 74 is provided to carry the wiring of the controller and feedback assemblies between the cargo tracked vehicle 30 and the wheeled mobile platform 12. In the preferred embodiment, the power conduit 48 and the control and data conduit 74 are incorporated in a unitary connecting conduit 76 extending from an outlet (not shown) of the cargo tracked vehicle 30 and terminating in a plug (not shown) mateable with a complementary receptacle (not shown) of the wheeled mobile platform 12. A unitary connecting conduit 76 facilitates the rapid interconnection and disconnection of the cargo tracked vehicle 30 to the wheeled mobile platform 12. Alternatively, any suitable combination of wiring and interconnection modes can be employed to connect the tracked vehicle 30 to the platform 12.

Figure 4:
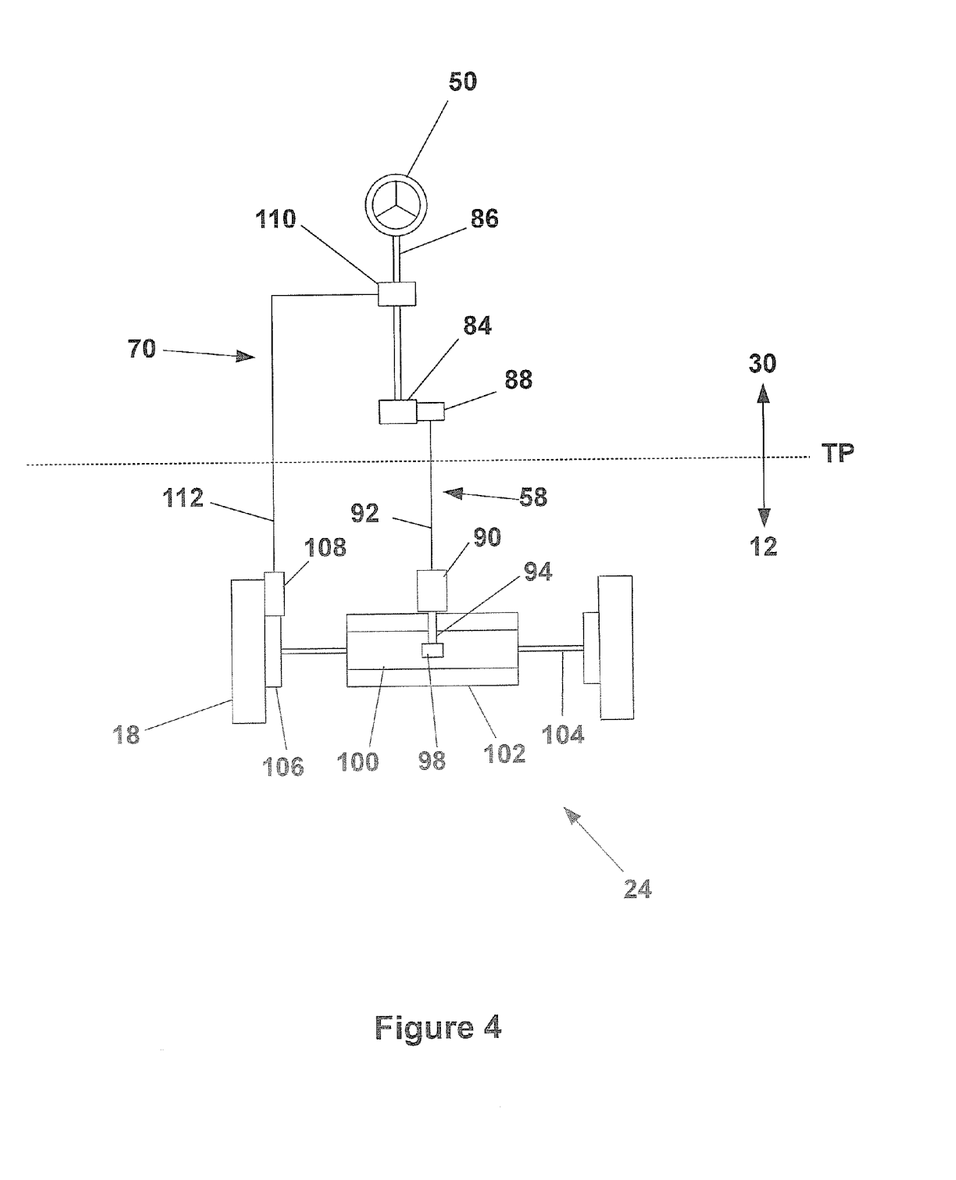
FIG. 4 shows a schematic diagram of a steering control, a steering controller assembly, a steering feedback assembly, and a steering system according to the present invention, with the dotted line TP denoting the boundary between the cargo tracked vehicle (T) and the wheeled mobile platform (P)

The steering controller assembly 58, best shown in FIG. 4, operatively connects the steering control 50 of the cargo tracked vehicle 30, preferably a steering wheel or joystick, to the steering system 24 of the wheeled mobile platform 12. In the preferred embodiment, the steering controller assembly 58 includes a steering sensor 84 mechanically engaged to a steering shaft 86 movable by the steering control 50. The steering sensor 84 communicates with a steering servo controller 88. The steering servo controller is connected to a steering servo motor 90 situated in the wheeled mobile platform 12, the connection preferably being mediated by steering control wiring 92 extending through the control and data conduit 74.

In operation, the steering sensor 84 collects data on the motions of the steering shaft 86, the steering servo controller 88 translates the data into electronic commands, and the steering control servo motor 90 translates the commands into forceful motion of a servo motor shaft 94. The servo motor shaft 94 is operatively engaged to a pinion gear 98 engaged with a rack gear 100 housed in a steering gearbox 102. The motion of the servo motor shaft 94 rotates the pinion gear 98 to cause the lateral motion of the rack gear 100. The lateral motion of the rack gear 100 is transmitted by a tie rod assembly 104 to produce cause angular movements of a steerable road wheel 18. Alternatively, the steering gearbox 102 includes a worm gear drive (not shown) or any steering gear assembly known in the art that can be operated by a rotary servo motor. Any suitable alternative mechanical linkage can also be employed to connect the steering servo motor 90 to the steerable road wheel 18.

The present invention optionally includes a steering feedback assembly 70 to provide a driver with tactile information about the positions of the steerable wheels. The steering feedback assembly 70 includes a steering motion sensor 106 to sense the angular position and angular velocity of at least two steerable road wheels 18. The steering motion sensor 106 communicates with a steering feedback servo controller 108, which processes data produced by the steering motion sensor 106 and accordingly generates electronic commands. A steering resisting servo motor 110, operatively engaged to the steering shaft 86 of the tracked vehicle 30, applies resisting torque to the steering shaft 86 in accordance with the electronic commands generated by the steering feedback servo controller 108. The steering feedback servo controller 108 is connected to the steering resisting servo motor 110 by steering feedback wiring 112 extending through the control and data conduit 74. Alternatively, steering resistance can be provided by any suitable resisting means known in the art. In an example of operation, the steering feedback servo controller 108 commands the steering resisting servo motor 110 to exert resisting torque on the steering shaft 86 in inverse proportion to the angular velocity of a steerable road wheel 18, so that the steering wheel 50 is more difficult for a driver to rotate early in the course of a turn than later in the course of the turn.

Electrical power to operate the steering control assembly 58 and steering feedback assembly 70 is preferably provided by the power plant 40 and battery 42 via the electrical system 20 of the wheeled mobile platform 12.

Figure 5:
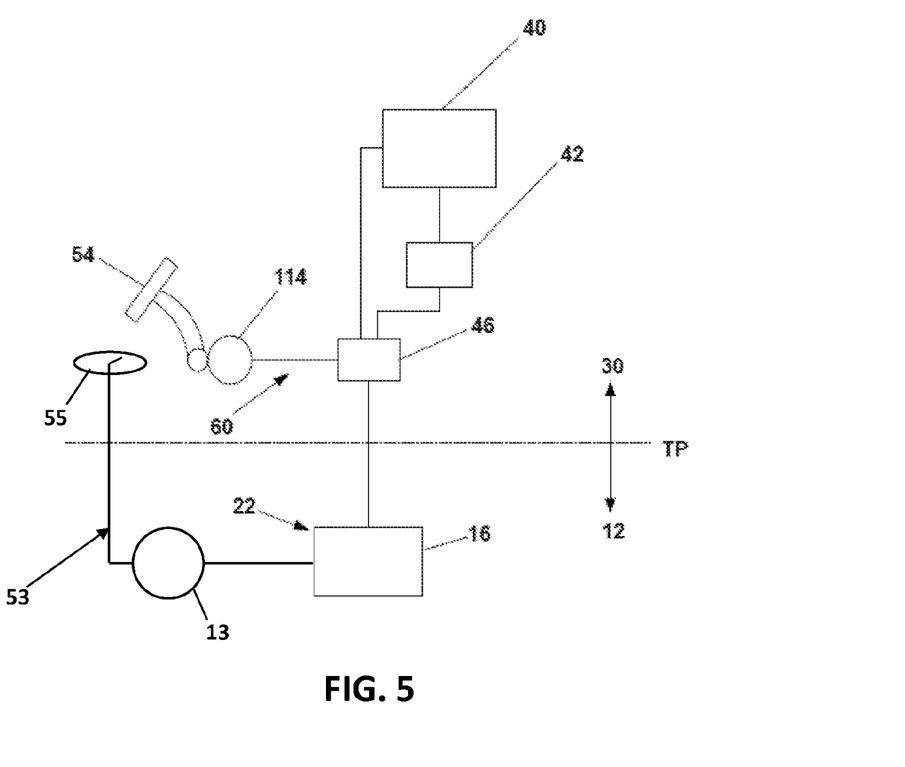
FIG. 5 shows a schematic diagram of a propulsion control, a propulsion controller assembly, and a propulsion system according to the present invention, with the dotted line TP denoting the boundary between the cargo tracked vehicle (T) and the wheeled mobile platform (P)

The propulsion controller assembly 60 of present invention, best shown in FIG. 5, operatively connects the propulsion control 54 of the cargo tracked vehicle 30, such as a conventional accelerator pedal, to the electrical controller 46 of the power plant 40 and battery 42, to regulate the voltage delivered to propulsion system 22 of the wheeled mobile platform 12. The propulsion system 22 of the wheeled mobile platform 12 includes at least an electrical motor 16. Specifically, the propulsion control 54 is operatively connected to a variable sensor 114, which is adjustable according to the position of the propulsion control 54. The variable sensor 114 transmits signals to the electrical controller 46 of the power plant 40 and battery 42, to regulate the amount of electrical power the electrical controller 46 delivers to the electric motor 16. Optionally, the connection between the electrical controller 46 and the electric motor 16 can be made via the electrical power distributor 47. A propulsion feedback assembly 53 includes at least any suitable speedometer known in the art to transmit the speed of at least one road wheel 13 to a speedometer 55 situated in the cargo tracked vehicle 30.

Figure 6:
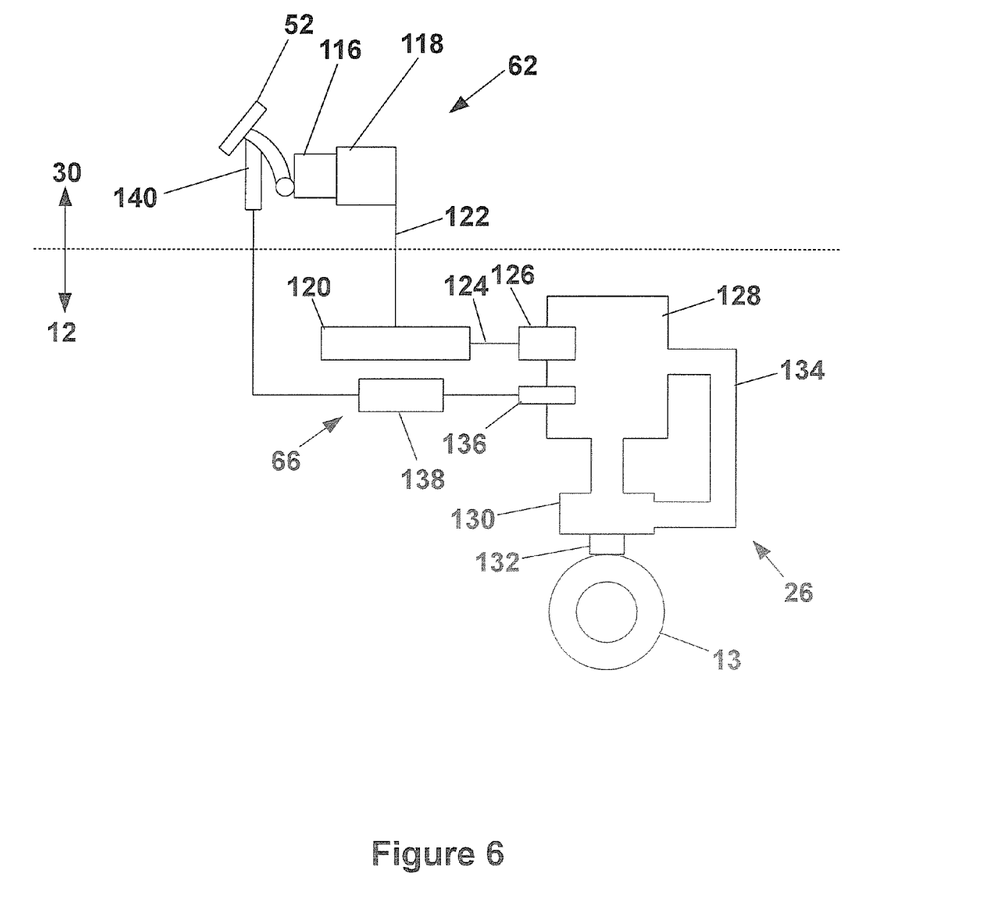
FIG. 6 shows a schematic diagram of a braking control, a braking controller assembly, a braking feedback assembly, and a braking system according to the present invention with the dotted line TP denoting the boundary between the cargo tracked vehicle (T) and the wheeled mobile platform (P)

The braking controller assembly 62, best shown in FIG. 6, operatively connects the brake control 52 of the cargo tracked vehicle 30 to the braking system 26 of the wheeled mobile platform 12. The braking system 26 includes at least a master cylinder 128, a hydraulic circuit 134 in fluid communication with the master cylinder 128 and with at least one brake actuator 130, which is operatively connected to a brake 132. The braking controller assembly 62 transduces a driver's pressure on a brake pedal or other brake control 52 into a corresponding braking action upon least two road wheels 13 of the wheeled mobile platform 12.

In the preferred embodiment, the braking controller assembly 62 includes a brake control pressure sensor 116 mechanically linked to the brake control 52, to sense pressure on the brake control 52. The brake control pressure sensor 116 communicates with a brake servo controller 118 connected to a brake servo motor 120 situated in the wheeled mobile platform 12, the connection being made by brake control wiring 122 extending through the control and data conduit 74. In operation, the brake control pressure sensor 116 collects pressure data from the brake control 54; the brake servo controller 118 processes the data and translates it into electronic commands; and the brake servo motor 120 translates the commands into forceful motion of a brake servo motor shaft (not shown). The brake servo motor shaft (not shown) is operatively engaged by means of a linkage 124 with the plunger 126 of a master cylinder 128 of any suitable type known in the art. The linkage 124 is preferably a cam type linkage that converts the rotary motion of the brake servo motor shaft 122 into a corresponding linear movement of the plunger 126 into the master cylinder 128, to exert pressure on hydraulic fluid within the master cylinder 128. The master cylinder 128 is in fluid communication with at least one brake actuator 130 of a brake 132 by means of a hydraulic brake circuit 134. The brake 132 is mounted on a road wheel 13. The plunger 126 is engaged to a plunger return spring (not shown) to maintain the plunger 126 in a resting position in the absence of force from the brake servo motor 120. In operation, the driver's pressure on the brake control 54 induces a corresponding rotary movement of the brake servo motor shaft (not shown), causing the plunger 126 to pressurize the hydraulic circuit 134 to exert force on the brake actuator 130, which presses the brake 132 against the road wheel 13. When the driver's pressure on the brake control 54 is released, the force of the return spring (not shown) returns the plunger 126 to its resting position and allows the brake actuator 130 to release the pressure of the brake 132.

The brake actuator 130 can include the brake piston (not shown) of a disc brake or the brake cylinder (not shown) of a drum brake. The braking controller assembly 62 is powered by the electrical system 20 of the wheeled mobile platform 12. Preferably, the brake servo motor 120 is sufficiently powerful to amplify the driver's pressure on the brake control 54 to stop the wheeled mobile platform 12 without need of auxiliary power boosters or other accessories.

In the preferred embodiment, the present invention also includes a braking feedback assembly 66 to provide a driver with tactile information the amount of braking force exerted in real time. The braking feedback assembly 66 includes a braking sensor 136 to sense changes in hydraulic pressure within the braking system, preferably by sensory connection to the interior of the master cylinder 128; a braking feedback controller 138 communicating with the braking sensor 136, to convert the data into electronic commands; and a brake resisting device 140 operatively engaged to the brake control 52. In operation, increased pressure within the master cylinder 128 causes the braking feedback controller 138 to command the brake resisting device 140 to increase the resistance of the brake control 52 against pressure exerted by the driver. The brake resisting device 140 can produce resistance by means of hydraulic or magnetic force against the brake control 52, or by any suitable pressure resisting mechanism known in the art.

Figure 7:
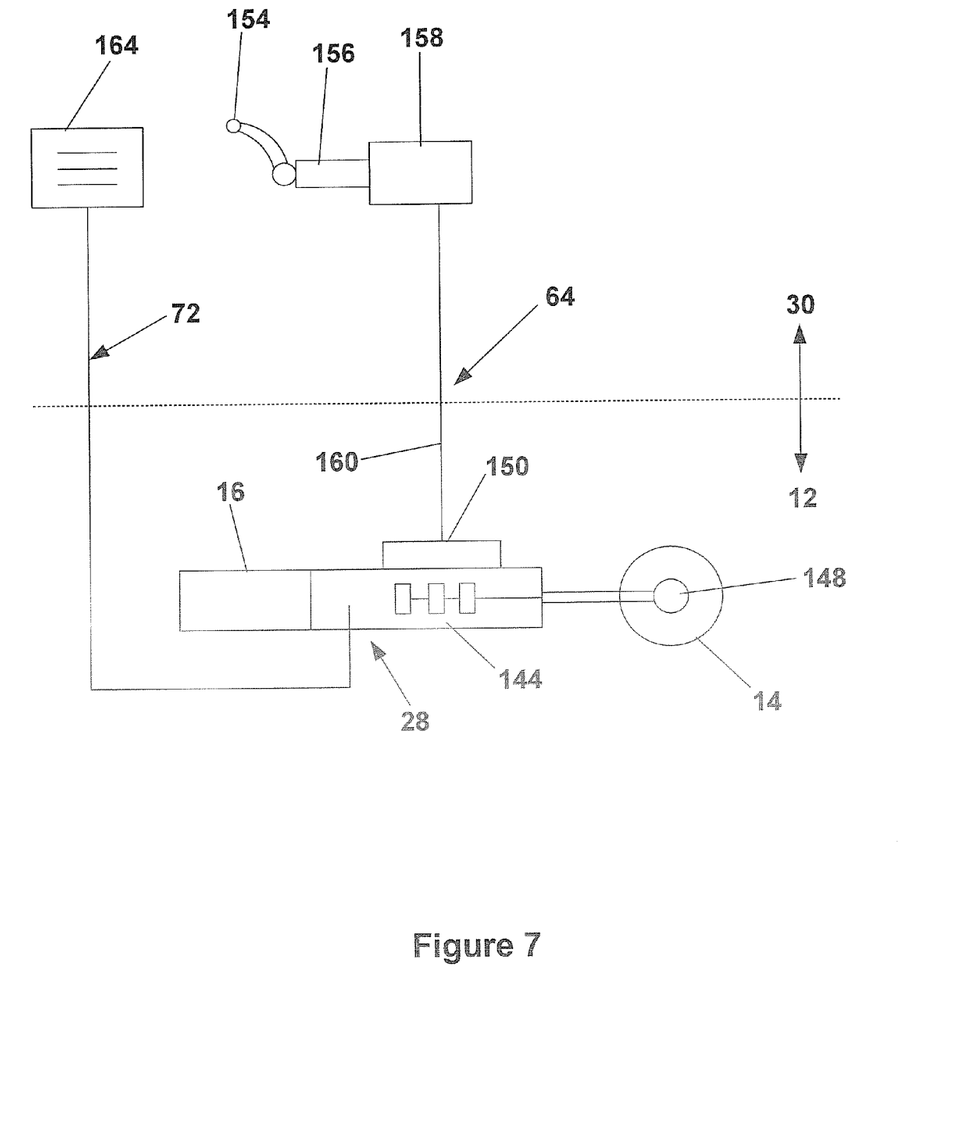
FIG. 7 shows a schematic diagram of a transmission control, a transmission controller assembly, a transmission feedback assembly, and a transmission system according to the present invention, with the dotted line TP denoting the boundary between the cargo tracked vehicle (T) and the wheeled mobile platform (P).

The present invention includes a transmission 28 and a transmission controller assembly 64. Preferably, the transmission 28 includes only a fixed gear ratio and a neutral free wheel mode, with variations in torque and speed provided by the electric motor 16 itself. Alternatively, the transmission 28 is an automatic transmission as best shown in FIG. 7, including a gear set 144, which is engaged to a final drive 148 to deliver power to at least two drive wheels 14. The transmission 28 is also preferably an electronically controlled transmission regulatable by a transmission control unit 150 of a type well known in the art, The transmission controller assembly 64 includes a shift selector 154 situated within the cargo tracked vehicle 30; a shift lever sensor 156, which senses changes in the position of the shift selector 154, and a shift controller 158 in communication with the shift lever sensor 156. The shift controller 158 processes changes in position of the shift selector 154 into signals encoding a selected shift of gears. The signals are transmitted via one or more transmission control wires 160 to the transmission control unit 150, where the signals are integrated into the overall control output of the transmission control unit 150 to produce gear shifts corresponding to the settings on the shift selector 154. The driver-selected gear settings can include including a plurality of forward speeds, neutral gear, reverse gear, and parking gear.

The present invention also includes a transmission feedback assembly 72 to inform a driver of the current transmission setting. The transmission feedback assembly 72 includes transmission feedback wiring 162 to transmit transmission status signals from the transmission control unit 150 to gear position indicator 164 visible to the driver of the cargo tracked vehicle 30 and wheeled mobile platform 12.

To transport a cargo tracked vehicle 30 under the power and control of a wheeled mobile platform 12 of the present invention, a user moves the cargo tracked vehicle 30 onto a mounting surface 32 of the wheeled mobile platform 12, anchors the cargo tracked vehicle 30 to the wheeled mobile platform 12, disconnects the power plant 40 and/or battery 42 from the electric motor (not shown) and electrical system (not shown) of the cargo tracked vehicle 30 and reconnects the power plant 40 and/or battery 42 to the electric motor 16 and electrical system 20 of the wheeled mobile platform 12, disconnects a plurality of driving controls of the cargo tracked vehicle 30, including but not limited to the propulsion control 54, the steering control 50, the braking control 52, and the transmission control 56 from, respectively, the propulsion system (not shown), steering system (not shown), braking system (not shown), and transmission system (not shown) of the cargo tracked vehicle 30, connects the plurality of driving controls to, respectively, the propulsion system 22, steering system 24, braking system 26, and transmission system 28 of the wheeled mobile platform 12, and drives the wheeled mobile platform 12 under the power and driving controls of the cargo tracked vehicle.

A need may arise to transport the wheeled mobile platform 12 without a cargo tracked vehicle 30 aboard. For that purpose, the present invention also includes a portable driver cabin (not shown), an enclosure which enables a user to operate the wheeled mobile platform 12 without a cargo tracked vehicle 30. The portable driver cabin includes a chassis (not shown) containing power plant, driving controls, and controller assemblies as previously described for the cargo tracked cabin 30. A control and data conduit 74, and a power conduit 48, as previously described, are provided to link the driving controls and electrical power of the portable driver cabin (not shown) to the electrical motor 16, electrical system 20, propulsion system 22, steering system 24, braking system 26, and transmission system 28 of the wheeled mobile platform 12. Wheels, skids, or other structures suitable to transport the cabin (not shown) onto the platform 12 and secure it to anchors 36 are also included.

Although the wheeled mobile platform 12 and the controller and feedback assemblies of the present invention have been disclosed in the context of the transport of a cargo tracked vehicle 30, they are easily adapted for the transport of any type of cargo vehicle that includes at least steering, braking, and propulsion controls.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

The invention claimed is:

1. A system for the transport of a cargo tracked vehicle, including:
   a wheeled mobile platform including a plurality of driving systems, said driving systems including a steering system, an acceleration system, a braking system, a transmission system, and a propulsion system;
   a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and
   at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;
   wherein said at least one controller assembly includes a steering controller assembly operatively connecting said steering control of said cargo tracked vehicle to said steering system of said wheeled mobile platform,
   said steering controller assembly including a steering sensor to sense a motion of a steering wheel of said cargo tracked vehicle, said steering sensor in communication with a steering servo controller to translate said motion of said steering wheel into an electronic command, said steering servo controller being operatively connected to a steering gear of said wheeled mobile platform to rotate said steering gear according to said electronic command.

2. A system for the transport of a cargo tracked vehicle, including:
   a wheeled mobile platform including a plurality of driving systems, said driving systems including a steering system, an acceleration system, a braking system, a transmission system, and a propulsion system;
   a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and
   at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;
   said system further including a steering feedback assembly operatively connected to said steering system of said wheeled mobile platform, to provide real-time information regarding the position of at least one steerable wheel of said wheeled mobile platform; said steering feedback assembly including a steering motion sensor to sense the steering motions of a steerable wheel of said wheeled mobile platform, said steering motion sensor in communication with a steering feedback servo controller to generate an electronic command according to said steering motions, said command receivable by a steering resisting servo motor mechanically connected to a steering shaft of said cargo tracked vehicle, to apply resisting torque to said steering shaft in accord with said command.

3. A system for the transport of a cargo tracked vehicle, including:
   a wheeled mobile platform including a plurality of driving systems, said driving systems including a steering system, an acceleration system, a braking system, a transmission system, and a propulsion system;
   a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and
   at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;
   wherein said at least one controller assembly is a braking controller assembly operatively connecting said brake control of said cargo tracked vehicle to said braking system of said wheeled mobile platform;
   said braking controller assembly including a brake control pressure sensor operatively connected to said brake control of said cargo tracked vehicle, to convert pressure on said brake control into an electronic command receivable by a brake servo motor operatively connected to a hydraulic brake circuit of said wheeled mobile platform, said hydraulic circuit including at least one brake actuator, said brake servo motor regulating a hydraulic pressure upon said at least one brake actuator according to said electronic command.

4. A system for the transport of a cargo tracked vehicle, including:
   a wheeled mobile platform including a plurality of driving systems, said driving systems including a steering system, an acceleration system, a braking system, a transmission system, and a propulsion system;
   a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and
   at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;
   said system further including a braking feedback assembly operatively connected to said braking system of said wheeled mobile platform, to provide real time information regarding a braking pressure exerted on at least one wheel of said wheeled mobile platform;

said braking feedback assembly including a braking sensor in communication with said hydraulic brake circuit of said wheeled mobile platform to sense a change in hydraulic pressure within said hydraulic brake circuit, said braking sensor being coupled to a braking feedback controller to generate an electronic signal in accord with said change in hydraulic pressure, said signal receivable by a brake resisting device mechanically connected to said brake control of said cargo tracked vehicle, to produce resisting force upon said brake control in accord with said signal.

5. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

wherein said at least one controller assembly is a propulsion controller assembly operatively connecting said propulsion control of said cargo tracked vehicle to said propulsion system of said wheeled mobile platform;

said propulsion controller assembly including a sensor operatively connected to said propulsion control of said cargo tracked vehicle, to translate a position of said propulsion control into an electrical signal receivable by an electrical controller in communication with said sensor, said electrical controller electrically connecting an electrical power source of said cargo tracked vehicle to said electric motor of said wheeled mobile platform, said electrical signal regulating the transmission of electrical power by said electrical controller from said electrical power source to said electrical motor;

said electrical power source being selected from said power plant, said at least one battery, or a combination of said power plant and said at least one battery.

6. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

said system further including a propulsion feedback assembly operatively connected to at least one road wheel of said wheeled mobile platform, to provide information regarding a speed of said at least one road wheel said propulsion feedback assembly including a speedometer.

7. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

wherein said at least one controller assembly is a transmission controller assembly operatively connecting said transmission control of said cargo tracked vehicle to said transmission system of said wheeled mobile platform;

said transmission controller including a shift lever sensor operatively connected to a shift lever of said cargo tracked vehicle, to sense a change in position of said shift lever, said shift lever sensor in communication with a shift controller to process said change in position of said shift lever into a signal encoding a shift of gears, said signal receivable by a transmission control unit operatively connected to a gear set, to produce a shift of said gear set in accord with said signal.

8. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

said system further including a transmission feedback assembly operatively connected to said transmission system of said wheeled mobile platform, to provide real time information regarding the setting of said transmission system;

said transmission feedback assembly including a gear position indicator.

9. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

said system further including a control and data conduit to carry at least one wired command link and at least one wired data link between said cargo tracked vehicle and said wheeled mobile platform.

10. A system for the transport of a cargo tracked vehicle, including:

a wheeled mobile platform including a plurality of driving systems, said driving systems including a steering system, an acceleration system, a braking system, a transmission system, and a propulsion system;

a cargo tracked vehicle mountable upon said wheeled mobile platform, said cargo tracked vehicle including a power plant, at least one battery chargeable by said power plant, and a plurality of driving controls, including a steering control, a propulsion control, a braking control, and a transmission control; and at least one controller assembly operatively connecting at least one of said plurality of driving controls of said cargo tracked vehicle to at least one of said driving systems of said wheeled mobile platform, to allow a driver housed in said cargo tracked vehicle to drive said wheeled mobile platform;

said system further including a power conduit to transmit electrical power from said cargo tracked vehicle to said wheeled mobile platform.

11. A method for transporting a cargo tracked vehicle on a wheeled mobile platform utilizing the driving controls and power of the cargo tracked vehicle, including the steps of:

moving the cargo tracked vehicle onto a mounting surface of the wheeled mobile platform;

anchoring the cargo tracked vehicle to the wheeled mobile platform;

disconnecting a power source of the cargo tracked vehicle from an electrical system of the cargo tracked vehicle;

connecting an electrical power conduit between the cargo tracked vehicle and the wheeled mobile platform;

electrically connecting a power source of the cargo tracked vehicle to an electric motor and an electrical system of the wheeled mobile platform;

disconnecting at least one driving control of the cargo tracked vehicle from a corresponding driving system of the cargo tracked vehicle connecting a control and data conduit between the cargo tracked vehicle and the wheeled mobile platform;

operatively connecting at least one driving control of the cargo tracked vehicle to a corresponding driving system of the wheeled mobile platform; and driving the wheeled mobile platform under the power and driving controls of the cargo tracked vehicle.

12. A method for transporting a cargo tracked vehicle on a wheeled mobile platform utilizing the driving controls and power of the cargo tracked vehicle, including the steps of:

moving the cargo tracked vehicle onto a mounting surface of the wheeled mobile platform;

anchoring the cargo tracked vehicle to the wheeled mobile platform;

disconnecting a power source of the cargo tracked vehicle from an electrical system of the cargo tracked vehicle;

connecting an electrical power conduit between the cargo tracked vehicle and the wheeled mobile platform;

electrically connecting a power source of the cargo tracked vehicle to an electric motor and an electrical system of the wheeled mobile platform;

disconnecting at least one driving control of the cargo tracked vehicle from a corresponding driving system of the cargo tracked vehicle connecting a control and data conduit between the cargo tracked vehicle and the wheeled mobile platform;

operatively connecting at least one driving control of the cargo tracked vehicle to a corresponding driving system of the wheeled mobile platform; and driving the wheeled mobile platform under the power and driving controls of the cargo tracked vehicle;

wherein the at least one driving control is selected from the group consisting of a propulsion control, a steering control, a braking control, and a transmission control, and the corresponding driving system is selected from the group consisting of, respectively, a propulsion system, a steering system, a braking system, and a transmission system.

\* \* \* \* \*